United States Patent Office 3,264,278
Patented August 2, 1966

3,264,278
POLYMERIZATION CATALYSTS AND
PROCESSES THEREFOR
Karl Nützel, Leverkusen, Germany, assignor to Farbenfabriken Bayer Aktiengesellschaft, Leverkusen, Germany, a German corporation
No Drawing. Filed Mar. 29, 1963, Ser. No. 269,144
Claims priority, application Germany, Apr. 7, 1962, F 36,496
8 Claims. (Cl. 260—94.3)

This invention relates to the polymerization of conjugated diolefins and is particularly concerned with an improved catalyst and a method for the production of polymers of controlled structure.

It is now well known that stereospecific polymers of conjugated dienes may be prepared in the presence of organic lithium compounds or mixed catalysts of organic compounds of the metals of the 1st to 3rd group of the Periodic System of the elements (PSE) or Mendeléeff Periodic Table and compounds of the metals of the 4th to 6th and 8th subgroup of the PSE. For example, isoprene can be polymerized with butyl lithium to an elastomer which contains more than 90% of 1,4-cis-bonds. With mixed catalysts of aluminum tributyl and titanium tetraiodide, a polybutadiene is obtained which similarly has more than 90% of 1,4-cis-bonds.

It is an object of this invention to provide improvements in a process for the production of stereospecific polydiolefins, advantageously polybutadiene and polyisoprene, using mixed catalysts. It is another object of this invention to provide novel catalysts for the polymerization of conjugated diolefins. The novel catalysts consist of organic chromium complexes of the formula $M_x[Cr(phenyl)_6]_y$ and metal halides of the metals of the 4th to 6th subgroup of the PSE, M representing a metal of the 1st, 2nd, and 3rd groups of the PSE, while $x$ is 1 or 3 and $y$ is 1 or 2. The catalyst system represents a novel composition of matter effecting the processing advantages which will be described hereinafter.

The production and the properties of the lithium chrominium complex of the formula $Li_3[Cr(phenyl)_6]$ are described in "Zeitschrift fuer anorganische Chemie" 295, page 145 (1958). The complexes of the metals of the 2nd and 3rd groups of the PSE, for example $Al[Cr(phenyl)_6]$, $Zn_3[Cr(phenyl)_6]_2$ and other complexes can readily be obtained by reaction of the corresponding anhydrous halides with the lithium chromium complex in inert solvents such as benzene or ether with strict exclusion of air and moisture. The complexes described are obviously analogous to the hexacyano and hexorhodano chromium complexes, in which the chromium atom is the central atom, the phenyl groups are ligands and one or more metal atoms are present in the 2nd sphere. They are always deep in color, the lithium derivative with a bright yellow color having the lightest color tone. The aluminum complex has a dark brown color, while the zinc and magnesium complexes are green and light brown, respectively. In contrast to the phenyl compounds of the metals of the 1st to 3rd groups of the PSE, these complexes are relatively sparingly soluble in ether and have relatively little solubility in benzene and toluene and are insoluble in aliphatic hydrocarbons. Another common feature is the rapid hydrogen absorption at room temperature with formation of analogous chromium complexes, in which phenyl groups are partially replaced by hydrogen atoms. The complexes crystallize out from ether as dark crystals with 2–3 mols of ether. In order to obtain results which can be reproduced, the complexes must be carefully freed from ether.

The pure complexes as well as the derivatives thereof which contain hydrogen do not polymerize dienes. It is only by an addition of compounds of the metals of the 4th to 6th sub-groups of the PSE that very active catalysts are obtained. The polymerization with these catalysts has surprising technical advantages compared with known catalyst systems.

Highly stereospecific polymers of a high molecular weight are already obtainable at room temperature in a good yield per unit of volume and time, and these polymers may be extended with oils. Such high molecular weights with technically equivalent yields per unit of volume and time could only be produced with catalysts containing lithium in the case of isoprene, but the 1,4-cis-contents of these polyisoprenes as well as the mechanical properties of the vulcanizates lie appreciably below those of the polymers which are produced with organometallic complex catalysts. Using organic compounds of the metals of the 1st to 3rd groups of the PSE and titanium tetraiodide, there have so far only been obtained polybutadienes with at most 95% of 1,4-cis-bonds. When using the complexes according to the invention and titanium tetraiodide, polybutadienes are obtained with up to 98% 1,4-cis-bonds that is within the range of a technically utilizable plasticity. The metal in the 2nd sphere of the complex is by no means unimportant. For example, when the lithium complex together with titanium tetraiodide is used, a polybutadiene is obtained with more than 90% of 1,2-bonds, whereas the aluminum derivative produces a polymer with up to 98% of 1,4-cis-bonds.

Polymerization using the catalysts according to the invention must take place with strict absence of air and moisture and also in the absence of compounds which contain oxygen, sulfur and nitrogen and which disturb the stereospecific arrangement of the polymers. It is advantageous to provide a protective layer of argon or ultra-pure nitrogen.

The polymerization can be carried out without solvents, but it is possible and in fact industrially advantageous to use inert solvents, such as aliphatic and cycloaliphatic hydrocarbons, aromatic hydrocarbons and if desired also chlorinated aromatic hydrocarbons. The ratio between solvent and monomer can be varied within relatively wide limits such as from 20:1 to 0.1:1. However, it is preferred to use a ratio between 12:1 and 3:1, which guarantees that the polymerization is carried out economically and in satisfactory manner. The polymerization temperature can be chosen to be between —15° C. and 90° C., preference being given to the temperature range between —5° C. and 40° C.

As described above, the catalyst consists of a combination of an organic chromium complex and a compound of a metal of the sub-groups 3 to 6 of the PSE. The compounds of the metals of the 3rd to 6th sub-group of the PSE are advantageously halogen compounds and examples of these catalyst combinations are set out below.

$Li_3[Cr(phenyl)_6]$ and $TiCl_4$
$Zn_3[Cr(phenyl)_6]_2$ and $TiI_4$
$Al[Cr(phenyl)_6]$ and $VOCl_3$ or $VCl_3$
$Mg_3[Cr(phenyl)_6]_2$ and $CrCl_3$ Complexs in which one or two phenyl groups are replaced by hydrogen can also be used as catalyst components, but the use thereof does not provide any advantage, since the polymers produced therewith often show a lower degree of stereo-specificity than the polymers which are obtained with the complexes containing exclusively phenyl groups.

The catalyst containing an organic chromium complex may be prepared by reacting of a chromium phenyl complex with a metal halide in an inert organic liquid and a protective gas. In carrying out polymerization of the present invention it is convenient to prepare the catalyst composition in the polymerization medium, but it is also possible to add the prepared catalyst composition to the polymerization medium, dissolving or dispersing the catalyst composition in an unreactive solvent such as the solvent used in polymerization.

The ratio by weight between chromium complex and metal halide may be varied between 0.05:1 and 1:5. The total quantity of the catalyst may be between 0.05 and 10 parts by weight per 100 parts by weight of monomer, but it is advantageous to use 0.5–2 parts by weight to 100 parts by weight of monomer.

The invention is more fully explained in the following examples, in which the parts indicated are parts by weight. All experiments were carried out with dry and oxygen-free substances with strict exclusion of air and moisture.

*Example 1*

200 parts of toluene were introduced into a 500 cc. three-necked flask with stirrer device and inlet pipe for butadiene and a suspension of 0.5 part of $Li_3[Cr(C_6H_5)_6]$ in 10 parts of benzene was then introduced. While stirring, 100 parts of butadiene were introduced and the mixture was kept for 48 hours at 20° C. No polymer could be isolated at the end of this period.

*Example 2*

As described in Example 1, a mixture of 200 parts of n-heptane and 100 parts of isoprene is added to 0.5 part of $Li_3[Cr(C_6H_5)_6]$, suspended in 10 parts of benzene and kept at 20° C. No polymer could be detected even after 48 hours.

*Example 3*

200 parts of toluene and 50 parts of butadiene are introduced into the apparatus described in Example 1 and 0.5 part of $Li_3[Cr(C_6H_5)_6]$ is added. Then 0.25 part of titanium tetraiodide is introduced. The mixture becomes dark in color; it is kept at 20° C. After only 5 minutes, an increase in viscosity can be detected. The operation is stopped after 2 hours and the polymer is precipitated in the usual way and dried. There is obtained a yield of 43.5 parts of polybutadiene with 93.6% of 1,2-, 2.38% of 1,4-trans- and 4% of 1,4-cis-bonds. The $\eta$ value was 3.7.

*Example 4*

200 parts of toluene and 50 parts of butadiene as well as 0.8 part of $Al[Cr(C_6H_5)_6]$ suspended in 15 parts of benzene are introduced into a flask as described in Example 1 and 0.25 part of $TiI_4$ is then added. The temperature of the dark reaction mixture rises within 15 minutes from 15° C. to 21° C. and is kept at this temperature with a mixture of ice and common salt. The reaction is stopped after 2½ hours and the polymer is worked up. A product of relatively high molecular weight is obtained with a $\eta$-value of 4 and a 1,4-cis-content of 98%.

*Example 5*

300 parts of n-heptane and 68 parts of isoprene are introduced into a three-necked flask equipped with a stirrer device and thermometer and 1 part of $Al[Cr(C_6H_5)_6]$ is added. The reaction mixture is brought to 25° C. and kept for 16 hours at this temperature. No polyisoprene can be detected at the end of this period.

*Example 6*

200 parts of n-heptane and 68 parts of isoprene are introduced into the apparatus described in Example 5 and a suspension of 0.5 part of $Li_3[Cr(C_6H_5)_6]$ and 0.5 part of $TiCl_4$ is then added, the mixture being kept for 4 hours at 20° C. while cooling with a mixture of ice and common salt. The dark brown reaction mixture becomes so highly viscous after 3½ hours that it can scarcely be stirred. After working up in the usual way, the yield is 61 parts. The 1,4-cis-bond content is 95% and the $\eta$-value is 4.6.

*Example 7*

0.5 part of $Al[Cr(C_6H_5)_6]$ suspended in 10 parts of benzene is added to 300 parts of heptane and 68 parts of isoprene as described in Example 5. 0.3 part of $TiCl_4$ is then introduced. The brown reaction mixture is kept at 20° C. and stirred. The polymerization is stopped after 3 hours and the substance worked up in the usual way, the yield being 60 parts. The polymer had a 1,4-cis bond content of 96.7% and a $\eta$-value of 4.8.

*Example 8*

0.5 part of $Li_3[Cr(C_6H_5)_6]$ suspended in benzene was treated for 12 hours at room temperature with gaseous, highly purified hydrogen at a pressure of 0.5 atm. The absorption of hydrogen is accompanied by a slight deepening in color. The complex which was formed and which contained hydrogen is used as described in Example 5 for polymerizing isoprene. After 48 hours, it is also not possible to detect any polymer.

*Example 9*

0.5 part of $Li_3[Cr(C_6H_5)_6]$ treated with hydrogen as described in Example 7 is added in a three-necked flask, equipped with a stirrer device and thermometer, to a mixture of 250 parts of n-heptane and 50 parts of isoprene. 0.6 part of $TiCl_4$ is then added. After 5 hours, it is possible to isolate 42 parts of a polyisoprene having 89.8% of 1,4-cis bonds.

*Example 10*

200 parts of toluene and 50 parts of butadiene are introduced into the apparatus described in Example 1 and a suspension of 1 part of $Zn_3[Cr(phenyl)_6]_2$ in 15 parts of toluene is added. Then, a suspension of 0.2 part of $TiI_4$ in 10 parts of toluene is added. The mixture is kept for 2 hours at a temperature of 20° C. After working up in the usual way, the yield is 36 parts of polybutadiene having a $\eta$-value of 4.2 and a 1,4-cis-content of 95.2 percent.

*Example 11*

200 parts of toluene and 50 parts of butadiene are introduced into the apparatus described in Example 1, adding a suspension of 1.5 parts of $Al(Cr(phenyl)_6)$ and 0.32 part of $VCl_3$ in 10 parts of benzene. The red mixture becomes slowly dark and the polymerization is stopped after 5 hours. The polymerization temperature is 20° C. The polymer is separated from the reaction mixture and dried in the usual way. The yield is 18 parts of a polybutadiene having 92.2 percent of 1,4-trans-content.

*Example 12*

According to Example 1 200 parts of toluene and 50 parts of butadiene are introduced, adding to this mixture 2 parts of $Zn_3[Cr(phenyl)_6]_2$. Then 2 parts of finely divided anhydrous $CrCl_3$ are added. After 12 hours there are obtained 12 parts of a polybutadiene, having 93.2 percent of 1,4-trans-bonds.

The $\eta$-value given in the examples means the intrinsic viscosity measured in an Ubbelhode viscosimeter with a solution of the polymer in toluene, containing 1 percent by weight of polymer at a temperature of 25° C.

I claim:

1. The reaction product of (a) an organic chromium complex compound of the formula $M_x[Cr(phenyl)_6]_y$, wherein M is selected from the group consisting of lithium, magnesium, aluminum, and zinc, x is a whole number from 1 to 3 and y is a whole number from 1 to 2, and (b) a metal halide, the metal of said halide being selected from the group consisting of a metal in Groups IVa–VIa of the Mendeléeff Periodic Table, the chromium complex compound being reacted with the said metal halide in an amount ranging from 0.05 to about 1 part by weight for about 1 to about 5 parts by weight.

2. The product of claim 1 wherein the organic chromium compound is $Li_3[Cr(phenyl)_6]$.

3. The product of claim 1 wherein the organic chromium compound is $Al[Cr(phenyl)_6]$.

4. A composition consisting of the reaction product of (a) an organic chromium complex compound of the formula $M_x[Cr(phenyl)_6]_y$, wherein M is a metal selected from the group consisting of lithium, aluminum, zinc and magnesium, $x$ is a whole number from 1 to 3 and $y$ is a whole number from 1 to 2, and (b) a metal halide selected from the group consisting of titanium tetrachloride, titanium tetraiodide, vanadium trichloride, vanadium oxytrichloride and chromium trichloride, the chromium complex compound being reacted with said metal halide in an amount ranging from 0.05 to about 1 part by weight for about 1 to about 5 parts by weight.

5. The composition of claim 4 in which the metal hailde is titanium tetrachloride.

6. The composition of claim 4 in which the metal halide is titanium tetraiodide.

7. A process for polymerizing a conjugated diolefin in contact with a metal-organic catalyst, which comprises conducting the poylmerization in the presence of the reaction product of (a) an organic chromium complex compound of the formula $M_x[Cr(phenyl)_6]_y$, wherein M is selected from the group consisting of lithium, magnesium, aluminum, and zinc, $x$ is a whole number from 1 to 3 and $y$ is a whole number from 1 to 2, and (b) a metal halide, the metal of said halide being selected from the group consisting of a metal in Groups IVa–VIa of the Mendeléeff Periodic Table, the chromium complex compound being reacted with the said metal halide in an amount ranging from 0.05 to about 1 part by weight for about 1 to about 5 parts by weight, said polymerizing being carried out in an inert medium at a temperature of between −15° C. to +90° C.

8. A process for the polymerization of a conjugated diolefin, which comprises conducting the polymerization in the presence of a composition consisting of the reaction product of (a) an organic chromium complex compound of the formula $M_x[Cr(phenyl)_6]_y$, wherein M is a metal selected from the group consisting of lithium, aluminum, zinc and magnesium, $x$ is a whole number from 1 to 3 and $y$ is a whole number from 1 to 2, and (b) a metal halide selected from the group consisting of titanium tetrachloride, titanium tetraiodide, vanadium trichloride, vanadium oxytrichloride, and chromium trichloride, the chromium complex compound being reacted with said metal halide in an amount ranging from 0.05 to about 1 part by weight for about 1 to about 5 parts by weight, the total amount of said composition being between 0.05 and 10 parts by weight per 100 parts by weight of the conjugated diolefin, said polymerizing being carried out in an inert medium at a temperature of between −15° C. to +90° C.

No references cited.

JOSEPH L. SCHOFER, *Primary Examiner.*

E. J. SMITH, *Assistant Examiner.*